(12) United States Patent
Thompson et al.

(10) Patent No.: US 10,329,098 B2
(45) Date of Patent: Jun. 25, 2019

(54) AUTOMATED VIAL HOPPER AND FEEDER ASSEMBLY

(71) Applicants: Derek William Thompson, Knightdale, NC (US); Bryant James Deakins, Raleigh, NC (US); Brian Marshall Burney, Wake Forest, NC (US)

(72) Inventors: Derek William Thompson, Knightdale, NC (US); Bryant James Deakins, Raleigh, NC (US); Brian Marshall Burney, Wake Forest, NC (US)

(*) Notice: Subject to any disclaimer, the term of this patent is extended or adjusted under 35 U.S.C. 154(b) by 0 days.

(21) Appl. No.: 15/228,276

(22) Filed: Aug. 4, 2016

(65) Prior Publication Data

US 2016/0338910 A1 Nov. 24, 2016

Related U.S. Application Data

(63) Continuation of application No. 14/709,995, filed on May 12, 2015.

(51) Int. Cl.
*B65G 47/14* (2006.01)

(52) U.S. Cl.
CPC .. *B65G 47/1457* (2013.01); *B65G 2201/0235* (2013.01)

(58) Field of Classification Search
CPC .......... A61J 1/16; B65G 47/14; G07F 11/005; G07F 11/06
See application file for complete search history.

(56) References Cited

U.S. PATENT DOCUMENTS

| | | | | |
|---|---|---|---|---|
| 3,447,662 A * | 6/1969 | House | ..................... | B65B 35/56 198/388 |
| 5,255,775 A * | 10/1993 | Buehren | ................ | B65G 47/24 198/395 |
| 5,860,563 A | 1/1999 | Guerra et al. | | |
| 7,100,796 B1 | 9/2006 | Orr et al. | | |
| 8,047,352 B2 * | 11/2011 | Yuyama | .................. | B65B 3/003 198/413 |
| 8,403,010 B2 | 3/2013 | Taniguchi et al. | | |
| 8,616,409 B2 | 12/2013 | Young et al. | | |
| 8,640,747 B2 * | 2/2014 | Imai | ........................ | B65B 5/103 141/129 |
| 8,944,281 B2 | 2/2015 | Inoue et al. | | |

(Continued)

*Primary Examiner* — Gene O Crawford
*Assistant Examiner* — Kelvin L Randall, Jr.
(74) *Attorney, Agent, or Firm* — Southeast IP Group, LLC.; Thomas L. Moses

(57) ABSTRACT

A vial hopper and feeder assembly is used in conjunction with automated prescription filling devices and systems, wherein the vial hopper and feeder assembly is configured to allow an operator to dump a large number of vials into a hopper in a random orientation, and the hopper/feeder assembly has the capability of selecting individual vials, orienting them in the proper direction, and delivering them individually in assembly line fashion, and in proper orientation, to the next step of the prescription filling process. A rotatable singulator receives the vials, feeds each vial individually to a pocket within a rotating turnstile. Sensors detect the presence and orientation of the vial, upright or upside down, and the turnstile rotates either clockwise or counterclockwise, based on the orientation of the vial within the pocket, to release each vial in one single direction.

8 Claims, 6 Drawing Sheets

(56) References Cited

U.S. PATENT DOCUMENTS

| | | | |
|---|---|---|---|
| 9,387,991 B2* | 7/2016 | Tse | B65G 47/1471 |
| 2010/0163373 A1* | 7/2010 | Giebler | B65G 47/1471 |
| | | | 198/803.16 |
| 2013/0032247 A1* | 2/2013 | Imai | B65B 5/103 |
| | | | 141/129 |

* cited by examiner

SECTION C-C

AUTOMATED VIAL HOPPER AND FEEDER ASSEMBLY

This is continuation of U.S. patent application Ser. No. 14/709,995, entitled VIAL HOPPER AND FEEDER ASSEMBLY, filed on May 12, 2015, incorporated herein by reference.

BACKGROUND OF THE INVENTION

The present invention generally relates to an apparatus for receiving a large number of containers or other objects, such as medical vials, in a randomly oriented fashion, and feeding the vials in a properly oriented manner to another location on an individual basis. More specifically, the present invention includes a vial hopper and feeder assembly that may be used in conjunction with automated prescription filling devices and systems, wherein the vial hopper and feeder assembly is configured to allow an operator to simply dump a large number of vials into a hopper in a random orientation, and the feeder assembly has the capability of selecting individual vials, orienting them in the proper direction, and delivering them individually in assembly line fashion to the next step of the prescription filling process.

It is becoming increasingly common for pharmacies to employ automated devices and systems to fill and refill prescriptions of medications, particularly in pill or tablet form. The ever-increasing demands on the time of pharmacists, including additional regulatory requirements and the need for more patient counseling, has combined with increasing labor costs to necessitate automation of the mundane tasks of pill-counting, bottle labeling and filling medical containers (or vials) in the prescription filling and refilling process. Many different apparatuses and systems have been developed to accommodate this need over the last few years.

As a part of the automation process for filling prescriptions, one particularly vexing problem has been how to automate the process of individually feeding medical vials in their proper orientation (open-side up) from a hopper or container that houses a large number of vials. In some cases, the hopper that initially receives the vials includes a cartridge, which is filled with vials that are already oriented in the same direction, so that the system is not required to perform the orientation task. One major problem associated with this method and device is that it takes a pharmacist (or assistant) quite a bit of time to individually load the vials into the cartridge so that each vial is oriented in the same direction. This process is much like manually loading a soft-drink vending machine with cans or bottles that are all oriented in the same direction.

Other devices use a variety of assemblies and methods to deal with the vial orientation and/or feeding issue. For example, U.S. Pat. No. 5,850,563 is directed to a medicine vial dispensing apparatus including a housing for storing medicine vials in a substantially axially horizontal storage orientation and a dispensing assembly for dispensing the vials in an upright orientation. The preferred embodiment includes a pair of spaced, resilient arms having respective, inwardly extending prongs that receive a vial therebetween. A slotted, rotating wheel receives a vial in the storage orientation and places it between the prongs. The closed end of the vial slips by one of the prongs while the other prong holds the interior surface of the open end until the vial attains a substantially upright orientation.

U.S. Pat. No. 7,100,796 discloses an apparatus for guiding the movement of a flanged vial during an automated process to prevent the flange from disrupting the movement of the vial during the process. The apparatus includes a receptacle with a narrowing peripheral wall adapted to receive the vial during a vertical drop and direct the movement of the vial toward a slide. A weighted flap contacts the vial as the vial moves along the slide, slowing the descent of the vial, holding the vial against the slide, and pivoting to accommodate the flange. A platform catches the vial.

U.S. Pat. No. 8,047,352 describes A vial supply device having a receiving section with a large capacity and capable of reliably discharging the vials includes: a receiving section for receiving many empty vials; a conveyance unit having a horizontal endless member located at a bottom wall of the receiving section and being configured to be driven in a horizontal direction, the conveyance unit being further configured to convey the vials in a horizontal direction by using the horizontal endless member; and a discharge unit having a vertical endless member located at a wall of the receiving section and being configured to be driven in a vertical direction, the discharge unit being further configured to lift the vials upward and discharge the same while allowing the vials to be horizontally supported at support members located at the vertical endless member at predetermined intervals.

U.S. Pat. No. 8,403,010 is directed to a tablet filling device, which can supply vials without any stop of the device even if the vials cause a jam within a stocker. The tablet filling device is related to removing a vial from a stocker accommodating a large number of vials according to a prescription data, dispensing tablets into the vial to fill the vial, and discharging the vial filled with the tablets. The stocker includes: a vial removing device configured to scoop the vial accommodated in the stocker upward to remove the vial; and a vial conveying device configured to convey the vial toward the vial removing device. When a jam of the vial occurs, the vial conveying device is reversely driven.

U.S. Pat. No. 8,944,281 describes an upright vial discharge unit. The medicine packing machine is equipped with a loading unit that is capable of receiving and delivering vials retrieved from a stocker, and a supplying unit that is capable of delivering the vials from the loading unit in an upright position. A control unit is also disposed between the loading unit and the supplying unit. As a result of the presence of the control unit, the transfer of vials received by the loading unit is controlled by the control unit in such a manner that the vials are not ejected towards the supplying unit. The vials are also controlled so as to be in an upright position once loaded into the loading unit. As a result of these actions, the vials received by the loading unit are reliably delivered to the supplying unit without being ejected or jamming at unanticipated locations.

All of the above-referenced U.S. patents are hereby incorporated by reference, in their entirety.

However, each of these devices and systems have disadvantages and problems associated therewith. It would be desirable to provide a simple, efficient, low-cost, automated vial hopper and feeder assembly module that could be used in conjunction with other automated devices for filling and labeling prescription bottles, and the like. Further, it would be desirable to provide such a system wherein the hopper could be loaded with bottles in a random orientation, so that a person could simply dump a load of such vials into the hopper without regard to their orientation, thus saving time, money and effort on the part of the pharmacist or worker. Moreover, it would be advantageous to provide such a system that could receive a vial, recognize its current orientation, and then take steps to place the vial in the proper or necessary orientation without the need for human intervention.

SUMMARY OF THE INVENTION

The automated vial hopper and feeder assembly, in a preferred embodiment, includes a round hopper tube, oriented angularly, for receiving a number or randomly oriented vials. A singulator is rotatably disposed in a lower portion of the hopper tube, and includes a series of generally round receptacles, each receptacle adapted to receive an individual vial, either in a generally upright or upside down orientation. The singulator rotates about a central axis and is driven by a singulator motor that is operatively attached thereto. The hopper tube and singulator are positioned above a singulator plate, which is also disposed in an angular configuration. Beneath the singulator plate, a rotatable circular turnstile is positioned along the same axis as the hopper tube and singulator. The turnstile includes a lower receptacle (also referred to herein as a "pocket") for receiving an individual vial from the singulator, wherein the vial is either oriented in a generally upright or upside down configuration. The singulator plate defines a hole, through which the singulator receptacles may operatively communicate with the lower receptacle in the turnstile.

A pair of proximity sensors are positioned adjacent the lower receptacle, and these proximity sensors are able to determine 1) the presence of a vial in the lower receptacle, and 2) the orientation of the vial within the lower receptacle (upright or upside down). The sensors are operatively connected to a computing device, which reads and processes the signals sent by the proximity sensors, and determines the next action to be taken based on the reading of the sensor signals. If the proximity sensors indicate that a vial is upright, then the turnstile rotates in a first direction (clockwise, for instance), and alternatively, rotates in the opposite direction (counterclockwise, for instance) if the proximity sensors indicate that the vial is in an upside-down orientation. When the turnstile rotates, the lower receptacle moves from a receiving position underneath the peak of the angled singulator plate to an ejection position, wherein the vial is gravity-fed along an angularly disposed slide plate and through a series of guides, and preferably onto a conveyor belt for transport to the next step of the prescription filling process. In this way, when the vial is dispensed from the slide plate onto the conveyor, each vial is oriented in the same direction, no matter how it was oriented in the singulator or the lower receptacle.

In use, after the hopper tube is filled with randomly oriented vials, the singulator begins to rotate, which agitates the vials and causes vials to fall into the singulator receptacles. When one of the singulator receptacles is positioned over the hole in the singulator plate, the vial falls from the singulator receptacle into the lower receptacle of the turnstile. There, the proximity sensors determine the presence and orientation of the vial, and send the signal to the computing device, which determines which direction to rotate the turnstile based on the orientation of the vial within the lower receptacle. The turnstile rotates, the vial is gravity fed down the slide plate and through the guides, and then the turnstile returns to the receiving position to receive the next vial. Then, the singulator rotates to the next position, so that the vial in the next singulator receptacle falls through the singulator plate and into the lower receptacle of the turnstile, and the process repeats itself.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

Figure 1:
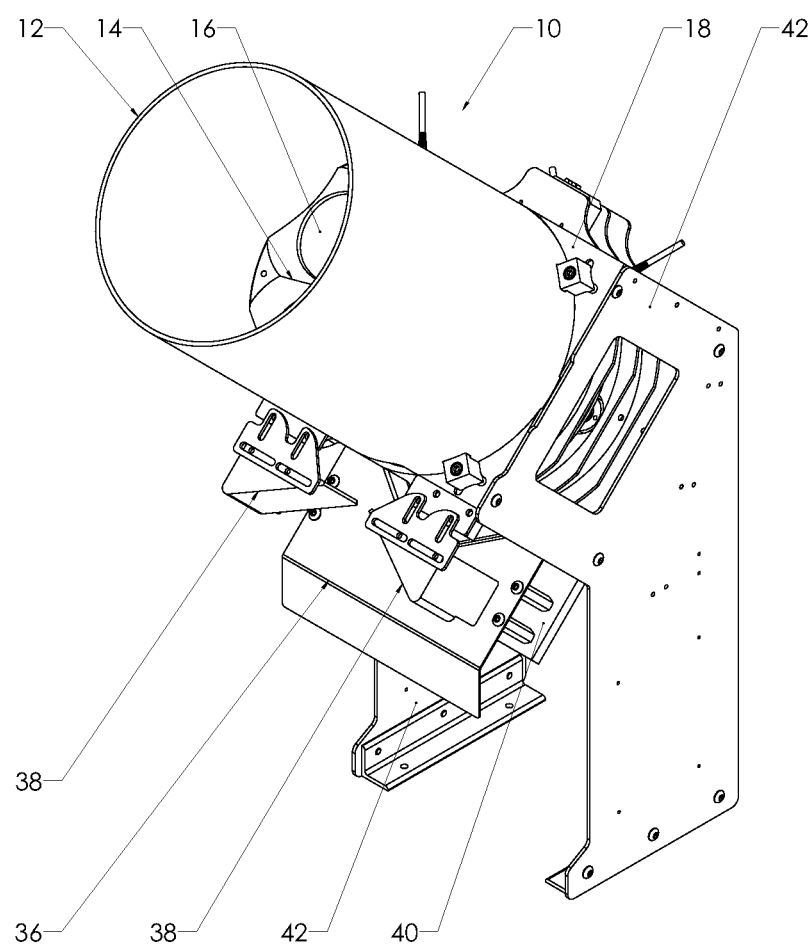
FIG. 1 is a perspective view of one embodiment of an automated vial hopper and feeder assembly in accordance with one aspect of the invention.
Figure 2:
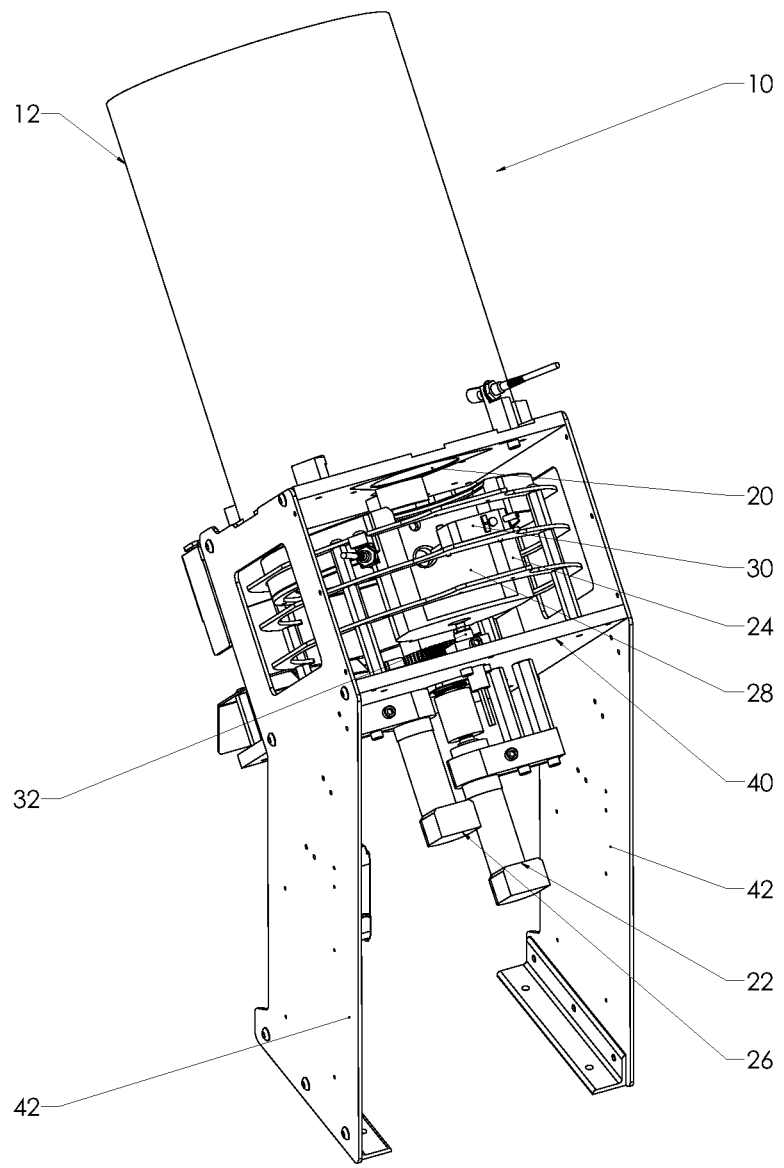
FIG. 2 is a perspective view of one embodiment of an automated vial hopper and feeder assembly in accordance with one aspect of the invention.
Figure 3:
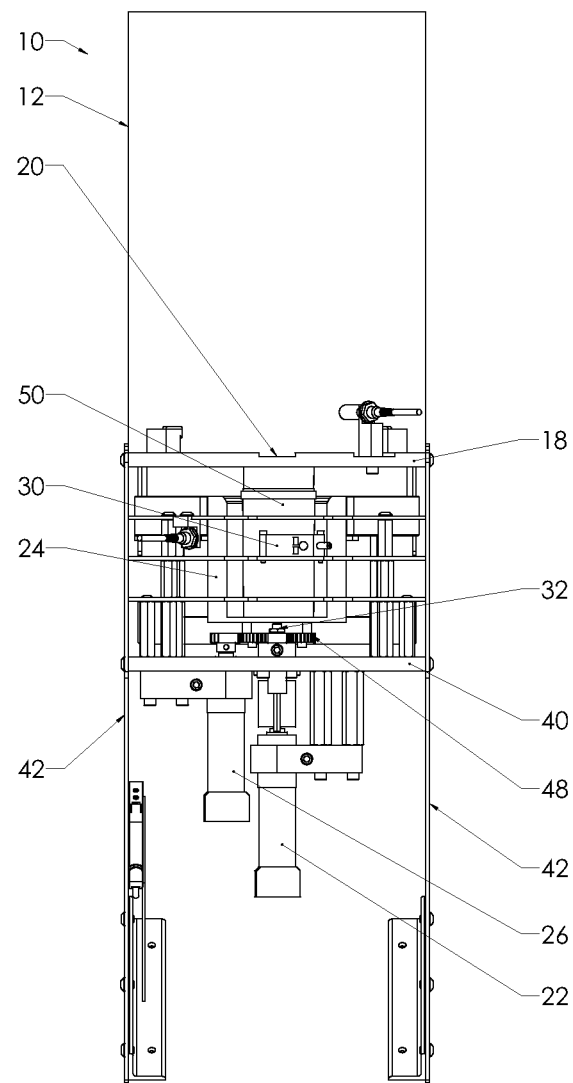
FIG. 3 is a rear view of one embodiment of an automated vial hopper and feeder assembly in accordance with one aspect of the invention.
Figure 4:
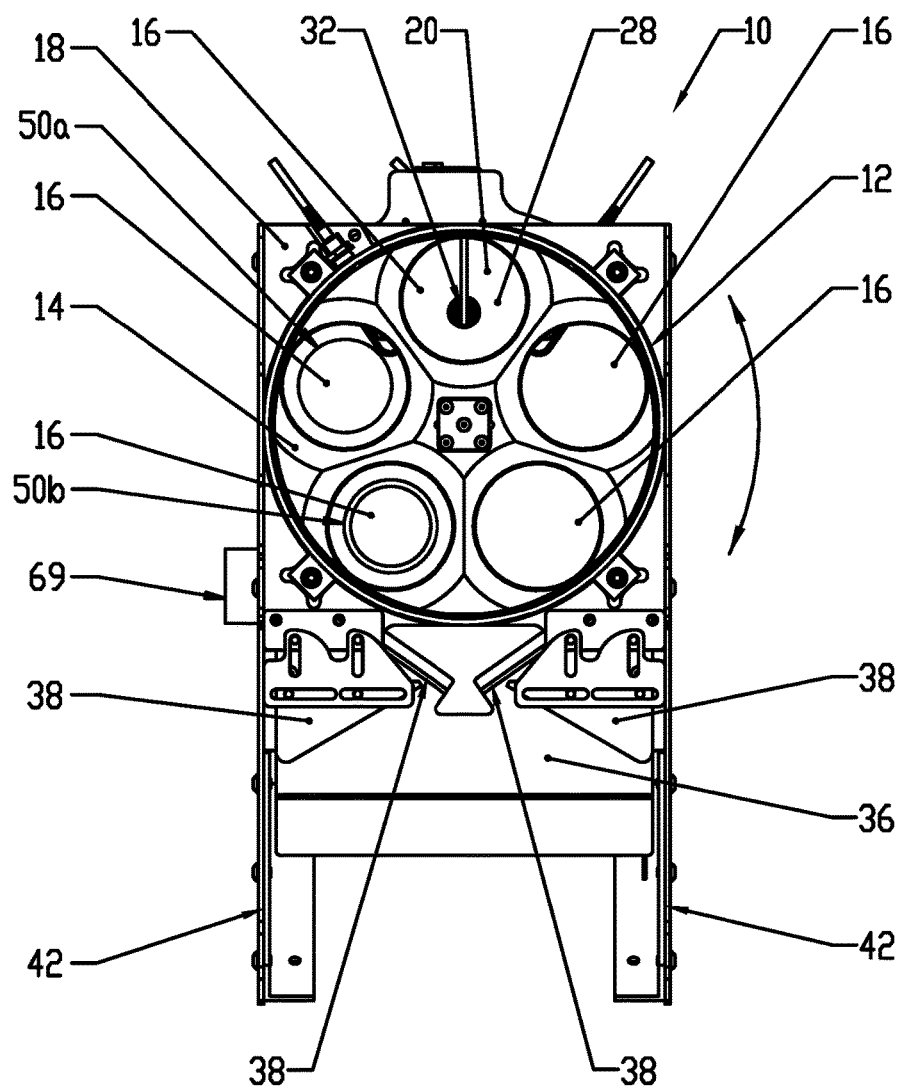
FIG. 4 is a raised angular view of one embodiment of an automated vial hopper and feeder assembly in accordance with one aspect of the invention.

One preferred embodiment of an automated vial hopper and feeder assembly 10 is shown in FIGS. 1-5. The vial hopper and feeder assembly 10 includes, in a preferred embodiment, a round hopper tube 12 disposed in angular fashion for receiving a number of randomly oriented medical vials 50 or other open-ended containers. A singulator 14 is rotatably disposed at a bottom portion of the hopper tube 12, and includes a series of generally round receptacles 16 for receiving one vial 50 per receptacle 16, wherein the vial 50 is either in an upright position or an upside-down position. The singulator 14 rotates about a central axis, and the singulator 14 is positioned atop a fixed singulator plate 18, which is also disposed in angular fashion, as shown. Each receptacle 16 includes an open bottom, and the singulator plate 18 includes or defines a hole 20 at an upper portion of the angled singulator plate 18. The singulator 14 is rotated by a motor 22 that is operatively connected thereto, and the singulator 14 is indexed to rotate from one position to the next, so that in a first position, a first receptacle 16 is aligned with the hole 20 in the singulator plate 18, and in a second position, a second, adjacent receptacle 16 is aligned with the hole 20 in the singulator plate 18. The singulator 14 rotates to each index and stops, so that when it stops, one of the receptacles 16 is directly above and aligned with the hole 20 in the upper portion of the singulator plate 18.

Below the singulator plate 18, a turnstile 24 is rotatably positioned so that it rotates about the same axis as the singulator 14. A turnstile motor 26 is operatively connected to the turnstile 24, which can be rotated in either direction, clockwise or counterclockwise. The turnstile 24 includes a lower receptacle 28 or pocket for receiving a vial 50 when the lower receptacle 28 is aligned with the hole 20 in the singulator plate 18 and one of the receptacles 16 of the singulator 14. A pair of proximity sensors 30,32 are disposed adjacent the lower receptacle 28, and are used to determine 1) the presence of a vial 50 in the lower receptacle 28, and 2) the orientation of the vial 50 (upright or upside-down) contained therein. In a preferred embodiment, a first proximity sensor 30 is positioned adjacent a side of the lower receptacle 28, and is aimed through the sides of the vial 50. This first proximity sensor 30 (also referred to herein as a "presence sensor") simply determines whether or not a vial 50 is present in the lower receptacle 28. A second sensor 32 may be disposed beneath the lower receptacle 28, and is aimed generally upwardly along an axis of a vial 50 that is positioned in the lower receptacle 28. This second sensor 32 (also referred to herein as an "orientation sensor") is preferably used to determine the orientation of the vial 50, meaning whether the vial 50 is in an upright orientation or an upside down orientation within the lower receptacle 28. Proximity sensors 30,32 are well known in the art, and any suitable proximity sensor may be used. Preferred proximity sensors include optical, mechanical, ultrasonic, or any other suitable proximity type sensor.

In a preferred embodiment, the hopper, the singulator and the turnstile mechanisms are disposed at an angle of about 45° from horizontal, but can be disposed in an angular range of 40° to 50° in one preferred range, 35° to 55° in another preferred range, or any other angle that is deemed suitable or desirable.

The sensors 30,32 are operatively connected to a programmable computing device or processor, which receives, interprets and processes the signals from the proximity sensors 30,32. The computing device, in response to the signals from the proximity sensors 30,32, rotates the turnstile 24 in one direction (clockwise, for instance) if it receives a signal that the vial 50 is in an upright orientation, or rotates the turnstile 24 in the opposite direction (counterclockwise, for instance) if it receives a signal that the vial 50 is in an upside-down orientation.

When the turnstile 24 rotates, the lower receptacle 28 moves from a receiving position underneath the hole 20 defined by of the angled singulator plate 18 to an ejection position, wherein the vial 50 is gravity-fed along an angularly disposed slide plate 36 and through a series of guides 38, and preferably onto a conveyor belt (not shown) for transport to the next step of the prescription filling process. The guides 38 include upper guides 38, which extend outwardly away from the singulator plate and engage the upper portion of the vial 50 upon ejection from the lower receptacle, and lower guides 38 attached to the slide plate 36 and disposed generally in a "V" shaped configuration, which engage the lower portion of the vial upon ejection. The guides are positioned to briefly catch the container at various points during the ejection process, to ensure a smooth, controlled ejection of the vial in the proper direction and desired orientation. In this way, when the vial 50 is dispensed from the lower receptacle and fed down the slide plate 36 onto the conveyor, each vial 50 is oriented in the same direction, no matter how it was oriented in the singulator 14 or the lower receptacle 28.

In use, after the hopper tube 12 is filled with randomly oriented vials 50, in a first step, the singulator 14 begins to rotate, which agitates the vials 50 and causes vials 50 to fall into the singulator receptacles 16. In a second step, when one of the singulator receptacles 16 is positioned over and aligned with the hole 20 in the singulator plate 18, a vial 50 falls from the receptacle 16 and through the hole 20 to the lower receptacle 28 in the turnstile 24, which is sensed by the proximity sensors 30,32 adjacent the lower receptacle 28. The signal from the proximity sensor 30 indicating the presence of a vial 50 causes the singulator 14 to stop rotating. There, in a third step, after the proximity sensors 30,32 have determined the presence and orientation of the vial 50 and sent the signal to the computing device, then the computing device determines which direction to rotate the turnstile 24 based on the orientation of the vial 50 within the lower receptacle 28. In the next step, the turnstile 24 rotates in the programmed direction and stops at a predetermined point (preferably about 180°) to eject the vial 50 from the lower receptacle 28. At that point, the vial 50 is gravity fed down the slide plate 36 and through the guides 38, which ensure that the vial 50 exits the slide plate 36 in the desired orientation, and then the turnstile 24 returns to the receiving position to receive the next vial 50 from the hopper tube 12. Then, the singulator 14 rotates to the next position, so that the vial 50 in the next singulator receptacle 16 falls through the hole 20 in the singulator plate 18 and into the lower receptacle 28 of the turnstile 24, and the process repeats itself.

In one embodiment, the guides 38 that are attached to or affixed above the slide plate may be adjustable, so that they may be repositioned in any desired manner and then resecured to or above the slide plate, in order to provide for a smooth and controlled ejection of the vial 50 from the lower receptacle 28.

Figure 5A:
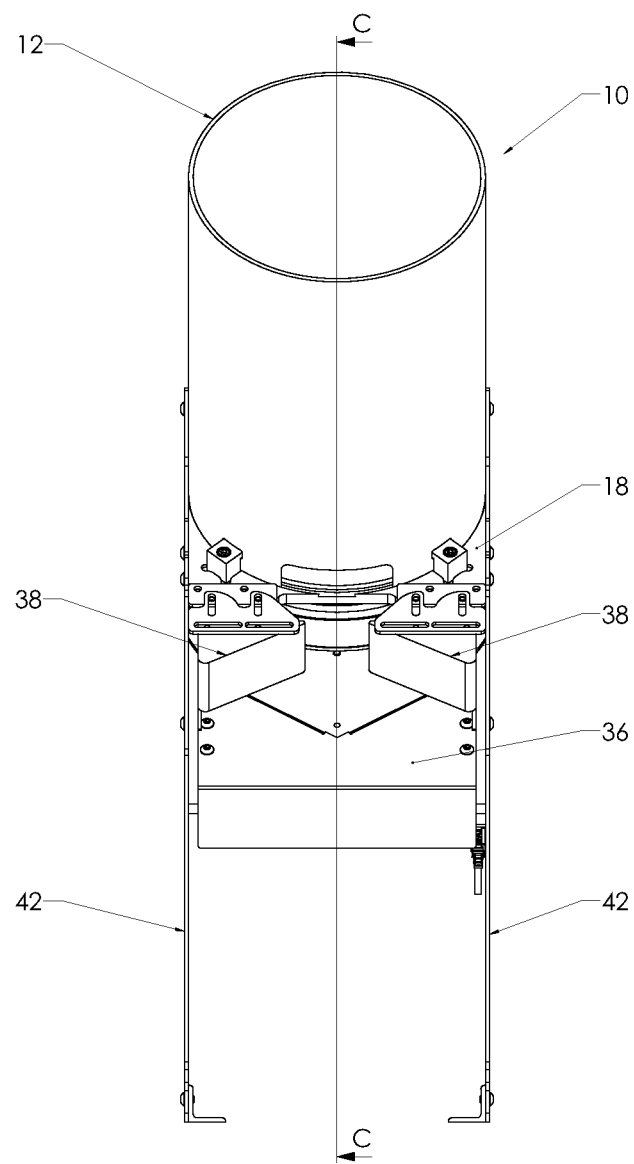
FIG. 5A is a partial front view of one embodiment of an automated vial hopper and feeder assembly in accordance with one aspect of the invention.
Figure 5B:
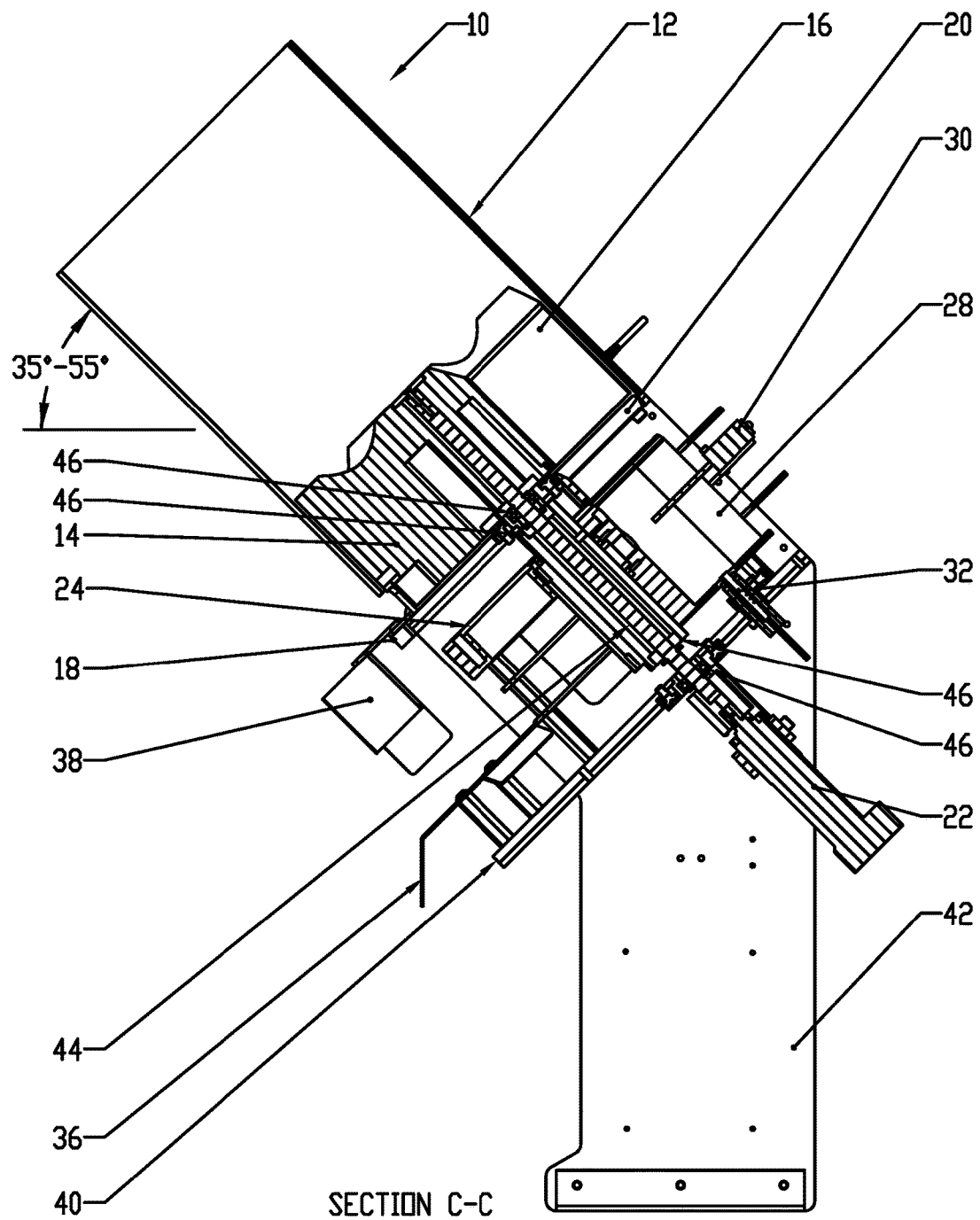
FIG. 5B is a cross-sectional view along the lines D-D as shown in FIG. 5A.

On an underside of the turnstile 24, a fixed, angled base plate 40 is disposed between a pair of vertical supports 42 that form a base of the vial hopper and feeder assembly 10. The singulator motor 22 is affixed to the base plate 40, and is attached to a drive shaft 44 that extends from the singulator motor 22 through the base plate 40, through the axis of the turnstile 24, and through the singulator plate 18, and is attached to the singulator 14. In a preferred embodiment, ballbearings 46 may be used between contact points where the drive shaft 44 passes through the base plate 40, the lower and upper portions of the turnstile 24, and the singulator plate 18, in order to provide for a smooth rotation of the drive shaft 44 and singulator 14, as shown in FIG. 5B. Additionally, the turnstile motor 26 is also mounted below the base plate 40, and is connected through the base plate 40 to a gear mechanism 48 that drives the turnstile 24, as shown.

Each step of the process is controlled by the computing device. The computing device controls the singulator motor 22, which rotates the singulator 14 from a first position (wherein a first receptacle 16 is aligned with the hole 20 in the singulator plate 18) to a second position (wherein the next adjacent receptacle 16 is aligned with the hole 20 in the singulator plate 18). The computing device is also operationally connected to the proximity sensors 30,32 and the turnstile motor 26. As mentioned above, the computing device receives signals from the proximity sensors 30,32 and determines when a vial 50 has been received by the lower receptacle 28 in the turnstile 24, and whether the vial 50 is oriented in an upright orientation or an upside-down orientation. Based on this information, the computing device determines which direction to rotate the turnstile 24 and the lower receptacle 28, and then causes such rotation to a predetermined point, allowing the vial 50 to fall out by the force of gravity. After a pre-programmed, set amount of time to allow the vial 50 to fall out, the computing device causes the turnstile 24 to rotate back to the position wherein the lower receptacle 28 is below and aligned with the hole 20 in the singulator plate 18. Then, the computing device causes the singulator 14 to rotate to the next position, wherein the process begins again.

It should be understood that the vial 50 may be ejected or released onto a conveyor belt in a preferred embodiment, but other devices or methods may be used to receive and transport the vial 50, in its proper orientation away from the vial hopper and feeder assembly 10. It is contemplated that the vial hopper and feeder assembly 10 may be formed into a module, and incorporated into a larger system for dispensing medications into the vials and labeling the vials, as desired. One advantage of the present system is that the steps are not based on exact, specific timing, as the sensors provide the impetus to perform certain tasks, rather than relying on exact timing and coordination of the various components. Additionally, it should be understood that although this system has been described in terms of refilling prescription medications and using medical vials or containers, the system could easily be used to receive and properly orient any type of container, or more broadly, any type of item, for any other type of process.

Although the present invention has been described in considerable detail with reference to certain preferred versions thereof, other versions are possible. Therefore, the spirit and scope of the appended claims should not be limited to the description of the preferred versions contained herein. All features disclosed in this specification may be replaced by alternative features serving the same, equivalent or similar purpose, unless expressly stated otherwise. Thus, unless expressly stated otherwise, each feature disclosed is one example only of a generic series of equivalent or similar features.

We claim:

1. A method of orienting items from a random configuration to a configuration wherein all items are oriented in the same direction, said method comprising the steps of:
    providing a hopper for receiving a plurality of said items in a randomly oriented fashion;
    providing a rotatable singulator, having a series or receptacles, wherein each receptacle receives a single item from said hopper, and wherein each said item is oriented either in an upright or upside down configuration within a receptacle;
    providing a turnstile having a pocket for receiving an item from one of said receptacles;
    transferring one of said items from one of said receptacles to said pocket, so that said item is disposed within said pocket in either a generally upright or generally upside down orientation;
    determining whether said item is in said generally upright orientation or is in said generally upside down configuration;
    rotating said turnstile in one of two directions, based on a determination of whether said item is oriented in a generally upright or generally upside down orientation, so that said turnstile rotates in a first direction if said item is in a generally upright orientation, and said turnstile rotates in a second direction if said item is in a generally upside down configuration;
    releasing said item from said pocket, so that upon release, said item is oriented in a single direction regardless of its orientation within said pocket.

2. The method set forth in claim 1, further including the step of rotating said singulator to agitate said items that are randomly disposed within said hopper.

3. The method set forth in claim 1, further including the step of providing at least one sensor to sense the presence of an item within said pocket.

4. The method set forth in claim 1, further including the step of providing at least one sensor to determine whether said item disposed within said pocket is in a generally upright or upside down orientation.

5. The method set forth in claim 1, further including the steps of:
    providing a motor operatively connected to said singulator; and
    utilizing said motor to rotate said singulator.

6. The method set forth in claim 4, further including the step of providing a turnstile motor operatively connected to said turnstile for providing rotational movement to said turnstile.

7. The method set forth in claim 5, further including the steps of:
    providing a computing device operatively connected to said sensor and said turnstile motor;
    causing said computing device to determine the direction of rotation of said turnstile based on signals received from said sensor.

8. The method set forth in claim 1, further including the step of providing a slide plate adjacent said turnstile for receiving and further orienting an item upon release from said pocket.

* * * * *